United States Patent
Gavita et al.

(10) Patent No.: US 9,071,693 B2
(45) Date of Patent: Jun. 30, 2015

(54) SYSTEM AND METHOD FOR ACTIVE CALL CONCIERGE FOR SUPPLEMENTARY CALL SERVICES

(75) Inventors: Edoardo Gavita, Laval (CA); Nazin Hossain, Brossard (CA); Mahdi Hirab, Pierrefonds (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1409 days.

(21) Appl. No.: 12/571,597

(22) Filed: Oct. 1, 2009

(65) Prior Publication Data

US 2011/0081011 A1    Apr. 7, 2011

(51) Int. Cl.
| | |
|---|---|
| *H04M 1/56* | (2006.01) |
| *H04M 15/06* | (2006.01) |
| *H04M 3/42* | (2006.01) |
| *H04M 1/57* | (2006.01) |
| *H04M 1/2745* | (2006.01) |

(52) U.S. Cl.
CPC . *H04M 1/57* (2013.01); *H04M 3/42* (2013.01); *H04M 3/42093* (2013.01); *H04M 1/274566* (2013.01); *H04M 3/42102* (2013.01); *H04M 3/42153* (2013.01)

(58) Field of Classification Search
CPC   H04M 3/42093; H04M 3/42; H04M 3/42102
USPC ............ 379/142.01, 142.02, 142.03, 201.01, 379/201.11, 207.02, 207.11
See application file for complete search history.

(56) References Cited

U.S. PATENT DOCUMENTS

| | | | |
|---|---|---|---|
| 6,278,774 B1* | 8/2001 | Yoshino ................. | 379/142.02 |
| 7,483,521 B2 | 1/2009 | Askerup et al. | |
| 2004/0114743 A1 | 6/2004 | Gilbert | |
| 2007/0263808 A1* | 11/2007 | Van Wyk et al. ........ | 379/142.01 |
| 2008/0043956 A1 | 2/2008 | Wu | |
| 2009/0143050 A1* | 6/2009 | Ignatin ..................... | 455/414.1 |

FOREIGN PATENT DOCUMENTS

| | | | | |
|---|---|---|---|---|
| GB | 2391750 A | * | 2/2004 | ............ H04M 1/57 |
| GB | 2 391 750 A | | 11/2004 | |
| WO | 2006/081981 A1 | | 8/2006 | |
| WO | 2009/063262 A1 | | 5/2009 | |

OTHER PUBLICATIONS

Abstract of KR2004095827A.
International Search Report for PCT/IB2010/054451 dated Jan. 27, 2011, 4 pages.

* cited by examiner

*Primary Examiner* — Nafiz E Hoque
(74) *Attorney, Agent, or Firm* — Ericsson Canada Inc.; Alex Nicolaescu (57) ABSTRACT

Systems and methods according to these exemplary embodiments provide active call concierge services wherein a network tracks users' behaviors with respect to, for example, supplementary services. When a user invokes a supplementary service toward a called party, the network captures this data. The network informs an agent on the user's device that it should prompt the user to reuse the same supplementary service the next time that the user dials the same called party. If the user inputs an acceptance of this suggestion, the user's device automatically appends or adds the service code associated with the repeated supplementary service to the outgoing call setup signal.

8 Claims, 8 Drawing Sheets

SYSTEM AND METHOD FOR ACTIVE CALL CONCIERGE FOR SUPPLEMENTARY CALL SERVICES

TECHNICAL FIELD

The present invention relates generally to communications and in particular to methods, devices and systems involving mobile communication systems and supplementary call services.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow the users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

With the advent of multimedia and 3G (and soon 4G) in the telecommunication area, it technically is no longer necessary to predicate the manner in which communications are performed on the type of media that is being communicated, i.e., 3G and 4G telecommunications are intended to be more media independent than previous generations of communications technology. However there will always be issues regarding how to handle legacy equipment and services as networks migrate to new technologies, and additionally there may be opportunities to improve existing service offerings by leveraging aspects of new network topologies. Of particular interest for this application are so-called supplemental or supplementary services.

The use of Supplementary Service Codes (SSC) enables users to gain access to, and control, supplementary services by using service code commands, which the user typically sends by, for example, typing key commands into his or her mobile phone. Examples of such supplementary services include call forwarding, anonymous call blocking and hiding a user's phone number when making a call. The service code command is used by the user to request a specific process (function) to be applied to the supplementary service such as: activation, deactivation, disabling, erasure, interrogation and invocation. A detailed discussion of supplementary services is provided below.

Figure 1:
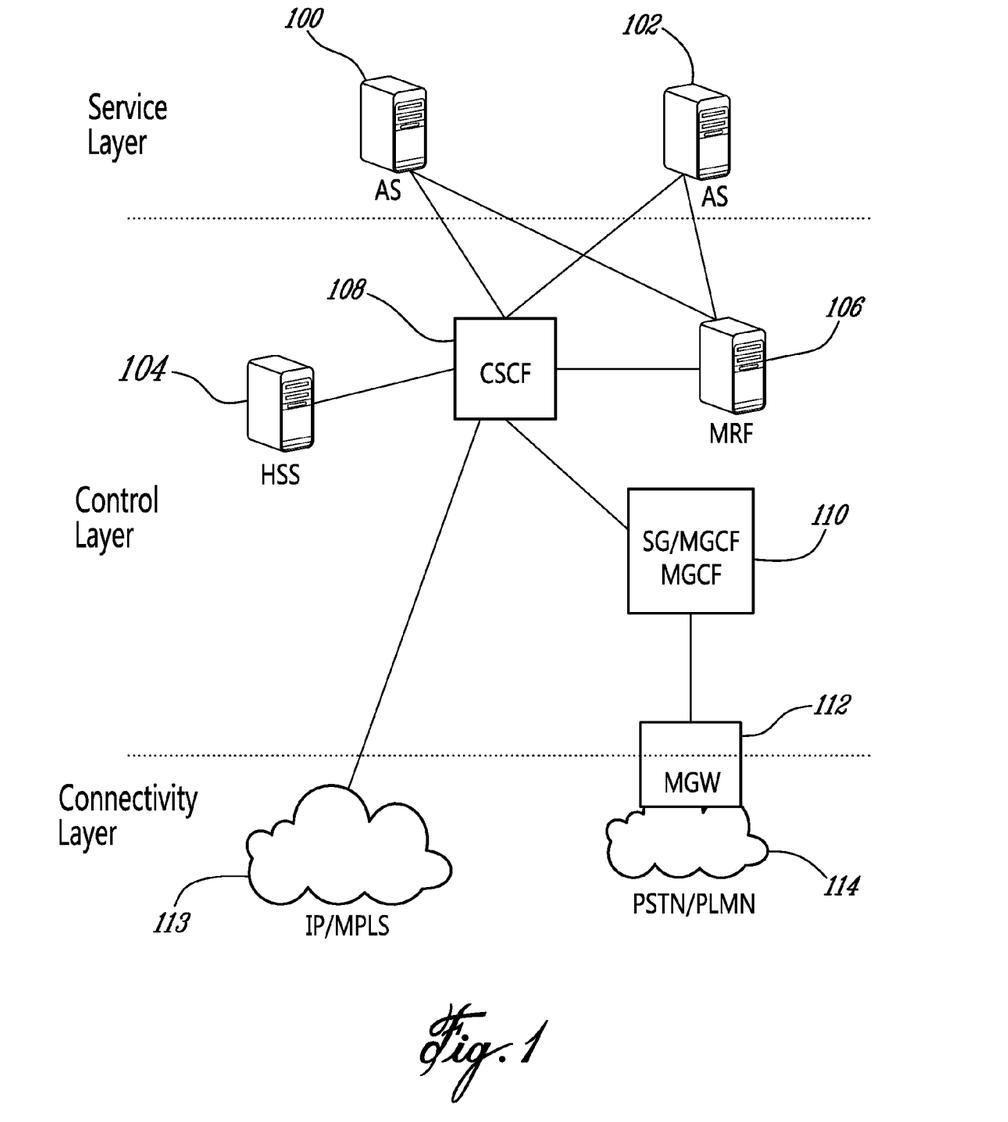
FIG. 1 depicts an exemplary IMS architecture.

While supplementary services have been in use for some time in conventional radiocommunication systems, e.g., in GSM mobile phone systems, new network topologies have been developed and are expected to be deployed in significant numbers. For example, in order to accommodate the new and different ways in which IP networks are being used to provide various services, new network architectures are being developed and standardized. One such development is the Internet Protocol Multimedia Subsystem (IMS). IMS is an architectural framework which uses a plurality of Internet Protocols (IP) for delivering IP multimedia services to an end user. A goal of IMS is to assist in the delivery of these services to an end user by having a horizontal control layer which separates the service layer and the access layer. FIG. 1 generally illustrates this architecture.

Therein, IMS systems can be broken down into the aforementioned three layers: (1) a service layer, (2) a control layer, and (3) a connectivity layer. The service layer contains application servers (ASs) which contain services and applications that can be delivered to an end user, e.g., radiocommunication services via server 100 and location-based advertisement services via server 102. The control layer describes the IMS core network and contains, among other elements, a home subscriber server (HSS) 104, a media resource function (MRF) 106, a call service control function (CSCF) 108, a signaling gateway/media gateway control function (SG/MGCF) 110 and a media gateway 112. These elements in the control layer are typically used for managing session set-up, resource modification and release of resources. The connectivity layer includes routers and switches used in both the backbone network and the access network, which elements are represented in FIG. 1 by Internet Protocol (IP)/multi-protocol label switching (MPLS) 113, the public switched telephone network (PSTN)/public land mobile network (PLMN) 114 and media gateway 112.

As part of the process of integrating legacy services, such as supplementary services, with new networking architectures, such as IMS architectures, it would be desirable to consider and develop new synergies between such services and network architectures.

SUMMARY

Exemplary embodiments relate to systems and methods for improving service for mobile devices and their users. According to exemplary embodiments, system and methods provide active call concierge services wherein a network tracks users' behaviors with respect to, for example, supplementary services. When a user invokes a supplementary service toward a called party, the network captures this data. The network informs an agent on the user's device that it should prompt the user to reuse the same supplementary service the next time that the user dials the same called party. If the user inputs an acceptance of this suggestion, the user's device automatically appends or adds the service code associated with the repeated supplementary service to the outgoing call setup signal. Advantages according to exemplary embodiments include automating the usage of supplementary services so that such services can be invoked without an end user having to input corresponding service codes as part of the call dialing process. However, it will be appreciated by those skilled in the art that such advantages are not to be construed as limitations of the present invention except to the extent that they are explicitly recited in one or more of the appended claims.

According to an exemplary embodiment, a method for invoking a service includes the steps of evaluating a telephone number to be called by a user equipment to determine that the telephone number is associated with a previously invoked service for the telephone number, and, in response to the evaluating step, transmitting a signal including an identifier associated with the service.

According to another exemplary embodiment, a user equipment includes an interface for transmitting and receiving signals, and a processor configured to evaluate a telephone number to be called by the user equipment to determine that the telephone number is associated with a previously invoked service for the telephone number, and also configured to command the interface to transmit a signal including an identifier associated with the service.

According to still another exemplary embodiment, a method for tracking user behavior and providing a concierge service includes the steps of receiving a signal indicating that a first user has called a second user and has invoked a service toward the second user, transmitting a signal including a calling number associated with the first user, a called number associated with the second user and an identifier associated with the service toward a local repository; and transmitting the called number and the identifier associated with the service toward a user equipment associated with the first user in support of the concierge service.

According to still another exemplary embodiment, a communication system includes a first communication node including an interface and a processor which are configured to receive a signal indicating that a first user has called a second user and has invoked a service toward the second user, to transmit a signal including a calling number associated with the first user, a called number associated with the second user and an identifier associated with the service toward a local repository; and to transmitting the called number and the identifier associated with the service toward a user equipment associated with the first user in support of the concierge service.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments, an enhanced service offering is provided whereby when a user implements a particular service, e.g., a supplementary service, with respect to, e.g., a called number or party, the network retains that information and uses it to automatically suggest (or invoke), e.g., the same supplementary service, when the user calls that same number or party again. For example, suppose that a mobile phone user places a call to a party whom she or he doesn't want to see her or his mobile phone number. That mobile phone user could then invoke the supplementary service which enables outgoing call number blocking by keying in the corresponding supplementary service codes into the keypad on her or his phone. According to exemplary embodiments, the network, e.g., an IMS network node, would recognize this new information regarding that user's invocation of a particular supplementary service toward a particular called party, save that information in the network and inform an agent on the user's phone. Then, the next time that the same mobile phone user dials the number of that same called party, the agent would, for example, automatically prompt that user to ask if she or he wanted to invoke the same supplementary service toward that called party.

Supplementary Services

Initially, some additional information regarding supplementary services, and their varied implementations, is provided to establish some context for the detailed exemplary embodiments to follow. It should be noted, however, that the present invention is not limited to providing its "concierge" service for only supplementary services, but could also be used to store behavior information and automate the invocation of other types of services.

For example, according to some exemplary embodiments, a user can gain access to, and control, the following supplementary services: Communication Forwarding Unconditional (CFU), Communication Forwarding on Busy (CFB), Communication Forwarding on No Reply (CFNR), Originating Communication Barring (OCB) (barring programs), Anonymous Communication Rejection (ACR), Modification of PIN, and Originating Identification Restriction (OIR) in temporary mode (Dynamic ad-hoc Identification Presentation/Restriction), the latter of which is used as an illustrative example in the discussion of the exemplary embodiments below. As mentioned above, control of these supplementary services is achieved by transmitting a corresponding service code or service code command from the user equipment to the network.

A service code command is made up of a number of basic functional elements (command parameters), some or all of which may appear explicitly in a command. These basic elements are: a service code prefix/access prefix, a service code, a function code, supplementary information, a block separation, and a command suffix. According to ITU-T Recommendations, E.131, there are three major code schemes concerning service code commands, for subscriber control of supplementary telephone services that are currently in use: the AT&T code scheme (USA), the CEPT (ETSI) code scheme (Europe), and the NTT code scheme (Japan). The main differences between those schemes are in the methods used to encode various command parameters, and the order in which they are presented in service code command. The following table shows the format of the information sent by the user or the user's device to the network for supplementary service for each of these three coding schemes.

TABLE 1

Format of functional elements in a service code command

| Coding scheme | Service code prefix/Access prefix | Service Code | Function code | Suppl. info | Block separator | Command suffix |
|---|---|---|---|---|---|---|
| AT&T | * or 11 | 2 digits | Not used (NOTE 1) | One block | Not used | # (NOTE 6) (NOTE 8) |

TABLE 1-continued

Format of functional elements in a service code command

| Coding scheme | Service code prefix/Access prefix | Service Code | Function code | Suppl. info | Block separator | Command suffix |
|---|---|---|---|---|---|---|
| ETSI (CEPT) | * or # (NOTE 8) | 2 or 3 digits | Not used (NOTE 2) | One or more blocks | * (NOTE 4) | # (NOTE 8) |
| NTT | # or 1 (NOTE 8) | 2 digits | 1 digit (NOTE 3) | One or more blocks | * (NOTE 5) | # (NOTE 7) (NOTE 8) |

(NOTE 1):
The function is expressed in the service code, different functions for the same service use consecutive codes
(NOTE 2):
The function is expressed in the service code prefix:
* activation,
deactivation,
* # interrogation
(NOTE 3):
Numerical function code that is required only for certain services: 0 - deactivation, 1 - activation
(NOTE 4):
Assumes to be used after the function code and between blocks of supplementary information. As a national option, block separator after the function code can be omitted.
(NOTE 5):
May be used between the function code and the first block of supplementary information, and between blocks of supplementary information for push-button telephones only.
(NOTE 6):
Command suffix # can be replaced by a time-out
(NOTE 7):
Command suffix # is used for push-button telephones only
(NOTE 8):
# is not supported with Tel URI, instead SIP URI shall be used As can be seen from the above table, the AT&T and NTT coding schemes for supplementary services include provisions for both rotary dial and modern telephone equipments (that include * and # keys), while the ETSI coding scheme considers only modern telephone equipment. Taking this into consideration, a general syntax for a supplementary service code command can be expressed as:

"PX SC (FC) ((SR) SI) SX"

where:
PX is a mandatory service prefix (ETSI) or access prefix (AT&T and NTT);
SC is a mandatory service code;
FC is an optional function code (used for NTT only);
SR is one or more separator(s), as required (for ETSI and NTT only);
SI is one or more supplementary information, as required; and
SX is a service command suffix as required.

When implementing supplementary services in, for example, a network which includes an IMS component, e.g., as described above with respect to FIG. 1, Session Initiation Protocol (SIP) signaling will be used to invoke and control supplementary services. For example, a SIP INVITE request that contains a supplementary service code command includes a Request-URI that could be either in SIP URI or Tel URI format as described below (albeit the Multimedia Telephony Service (MMTel) 2.0 standard does not support the '#' symbol used in the Tel URI format and, therefore, the SIP URI format may be a preferred solution). However, if the Tel URI format is used to invoke supplementary services, then the service code command is contained in 'telephone-subscriber' part and is encoded as 'local-number', as described in the standards document IETF RFC 3966, the disclosure of which is incorporated here by reference. An example of such a signaling format is tel:*21*12345678#; phone-context=domain.pes.operator.com.

Alternatively, in the case where a SIP URI is used to convey supplementary service instructions, the service code command can be contained in the 'userinfo' part of the URI. The 'userinfo' part of the URI is in the form of 'telephone-subscriber' and the service code command is encoded as 'local-number', as described in ETSI TS 183 043, the disclosure of which is incorporated here by reference. As an example, such a supplementary service command could be formatted as: sip:*21*12345678%23;phone-context=domain.pes.operator.com @pes.operator.com; user=phone. Note, however, that for certain legacy user equipments (UEs), support for the "user=phone" parameter is not required. Instead, the system will be configured to handle the service code command with or without the "user=phone" parameter.

The foregoing signaling format discussion applies for both supplementary service code commands issued outside of a call as well those issued during a call set-up phase. In the latter case, such service code commands may also include the final destination number where the call is to be terminated. There are a number of variants on the types of supplementary services which can be invoked using the afore-described signaling formats and based upon the particular SSCs which are selected by the user and embedded in the signal. According to exemplary embodiments described below under the heading "Active Call Concierge Services", such codes may also be added automatically to an outgoing call based upon previously stored network information. Table 2 below describes exemplary supplementary services which can be supported by a MulTimedia Application Server (MTAS) in an exemplary communications network including an IMS component according to exemplary embodiments.

TABLE 2

Exemplary Supplementary Services

| Supplementary Service | Basic functionality |
|---|---|
| Anonymous Communication Rejection (ACR) | Allows the served User to reject incoming communications for which the asserted public User identity of the originating User is restricted. |

TABLE 2-continued

Exemplary Supplementary Services

| Supplementary Service | Basic functionality |
|---|---|
| Communication Barring (CB) | Allows a User to bar certain categories of outgoing and/or incoming communications. |
| Communication Deflection (CD) | Allows a User to respond to an incoming session by requesting the redirection of that session to another User. |
| Communication Diversion (CDIV) | Enables a User to have the network redirect communications to another User. Variants of conditions include: unconditional, busy, no reply, not logged in, 'deflection' (=explicit forwarding during call setup phase). |
| Communication Hold/resume (HOLD) | Enables a User to suspend media within a session, and resume that media at a later time. |
| Conference (CONF) | Enables a User to participate in and control communication involving a number of Users. |
| Originating Identification Presentation (OIP) | Provides the terminating party with the asserted identity of the originating party. |
| Originating Identification Restriction (OIR) | Enables the originating party to withhold the presentation of its asserted identity information to the terminating party. |
| Terminating Identification Presentation (TIP) | Provides the originating party with the asserted identity of the terminating party. |
| Terminating Identification Restriction (TIR) | Enables the terminating party to withhold presentation of its asserted identity information to the originating party. |

In order to complete this discussion of supplementary services which can be invoked by a concierge service according to these exemplary embodiments, a number of specific examples are provided below (using the ETSI coding scheme) to illustrate different supplementary service codes. Therein, the symbols-characters used in the attributes have the following meanings service prefix for service activation (used before service code), \# service prefix for service deactivation,

*\# service prefix for service interrogation, 21 service code for Call Forwarding Unconditional (CFU), 31 service code for OIR invocation/disabling on a per call basis, 34 service code for Outgoing Call Barring (OCB), 61 service code for Call Forwarding No-Reply (CFNR), 03 service code for PIN modification,

* block separator (optional when used after the service code),

\# command suffix

EXAMPLE 1

Activation of CFU (without a Pin and an Optional ND)

*21*ND#
*21ND#
*21#

Note that, in the foregoing example, if the ND is omitted, it means that the communication is to be diverted to the ND from previous CFU activation. The ND from the previous CFU activation is only saved if the operator node level configuration is set to retain the service data.

EXAMPLE 2

Activation of CFU (with a PIN and an Optional ND)

*21*PIN*ND#
*21PIN*ND#
*21*PIN#
*21PIN#

EXAMPLE 3

Deactivation of CFU (with/without a Pin)

\#21*PIN#
\#21PIN#
\#21#

EXAMPLE 4

Interrogation of CFU, Service Status Check (with/without a PIN)

*\#21*PIN#
*\#21PIN#
*\#21#

EXAMPLE 5

Verification of CFU, Service Data Check (with/without a PIN and Mandatory ND)

*\#21*PIN*ND#
*\#21PIN*ND#
*\#21*ND#
*\#21ND#

EXAMPLE 6

Activation of CFNR (with PIN and Optional ND and RT)

*61*PIN*ND#
*61PIN*ND#
*61*PIN*ND*RT#
*61PIN*ND*RT#
*61*PIN* *RT#
*61PIN* *RT#
*61*PIN#
*61PIN#

EXAMPLE 7

Activation of OCB (with Mandatory PIN)

*34*PIN*BP#

EXAMPLE 8

Deactivation of OCB (with Mandatory PIN)

\#34*PIN#

EXAMPLE 9

PIN Modification (New PIN Repeated Twice)

*03*OPIN*NPIN*NPIN#

EXAMPLE 10

Invocation of OIR on a Per Call Basis (Also Known as 'Activation of Dynamic ad-hoc Identity Restriction')

*31*ND#
*31*ND

EXAMPLE 11

Disabling of OIR on a Per Call Basis (Also Known as 'Activation of Dynamic ad hoc Identification Presentation')

31*ND#
31*ND

Active Call Concierge Services

These types of supplementary services, as well as other types of services available in communication systems, can be invoked automatically using network-tracked behaviors as part of an active call concierge service according to exemplary embodiments. For example, such exemplary embodiments can capture and log when a legacy mobile user (i.e., via circuit-switched access) has used one of the supplementary services toward a particular called party and then suggest the option to re-use the same supplementary service when the user is calling the same recipient (e.g., the second time). An exemplary embodiment of such active call concierge services will be described beginning with a discussion of FIG. 2.

Figure 2:
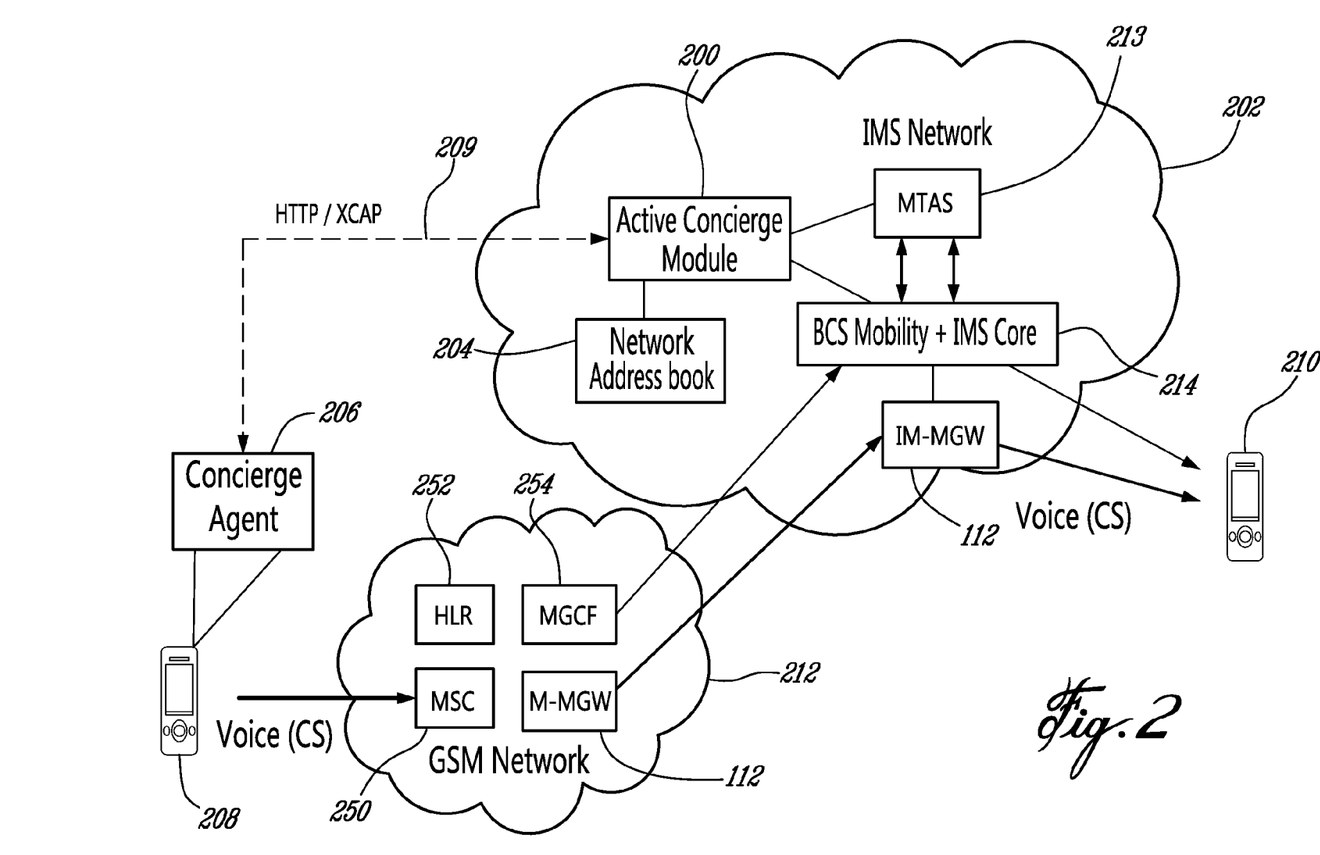
FIG. 2 shows an exemplary communication system for providing concierge services according to an exemplary embodiment.

Therein, an active call concierge module (ACCM) 200 can be implemented as a software module or entity running in the network, in this example an IMS network 202 although those skilled in the art will appreciate that other types of networks could also implement concierge services according to the present invention. The ACCM 200 will, among other things, detect when a mobile user initiates a supplemental service when making his or her call. When the use of a supplementary service is detected, the ACCM 200 will store associated call attributes in a local repository, e.g., information which can include the called number, the caller's number, and an identifier of the invoked supplemental service (e.g., OIR). These call attributes can be stored in many different locations including, for example, a Network Address Book Call-History data base, an XDMS repository, or even the user equipment itself depending on the particular implementation of the service as long as they can be easily retrievable by the ACCM 200. In this particular example, the call attributes are stored in a network address book 204.

According to this exemplary embodiment, once the ACCM 200 stores the call attributes, the ACCM 200 proceeds to send some or all of these call attributes, e.g., the called number and the associated supplementary service identifier, to an Active Call Concierge Application or Agent (ACCA) 206 that runs on the user's mobile device (UE) 208. The ACCA 206 is responsible for receiving the call attributes (e.g., via an HTTP/XCAP submission mechanism 209 or by re-using a SyncML process associated with the network address book 204) and then storing those attributes in the device's internal memory (not shown in FIG. 2, see FIG. 5). In addition to receiving and storing call attribute data, the ACCA 206 can constantly be running in background mode on the UE 208 to scan when the user dials in digits for calling purposes. When ACCA 206 detects that the user has dialed a number that matches a previously stored number in its internal call attributes repository, ACCA 206 can, for example, display a message informing the mobile user that she or he previously initiated a particular supplementary service when calling the called party 210 which she or he has now dialed again. In addition, or alternatively, ACCA 208 can also propose other supplementary services that the network will support, e.g., a second supplementary service which is commonly used by people who invoke the initial supplementary service used to make the first call to UE 208. Identifiers associated with these other supplementary services can be sent by the ACCM 200 down to the ACCA 206 running on the UE 208 as well, which data will then also be stored internally and cross-referenced against, e.g., the called party's number.

Figure 3:
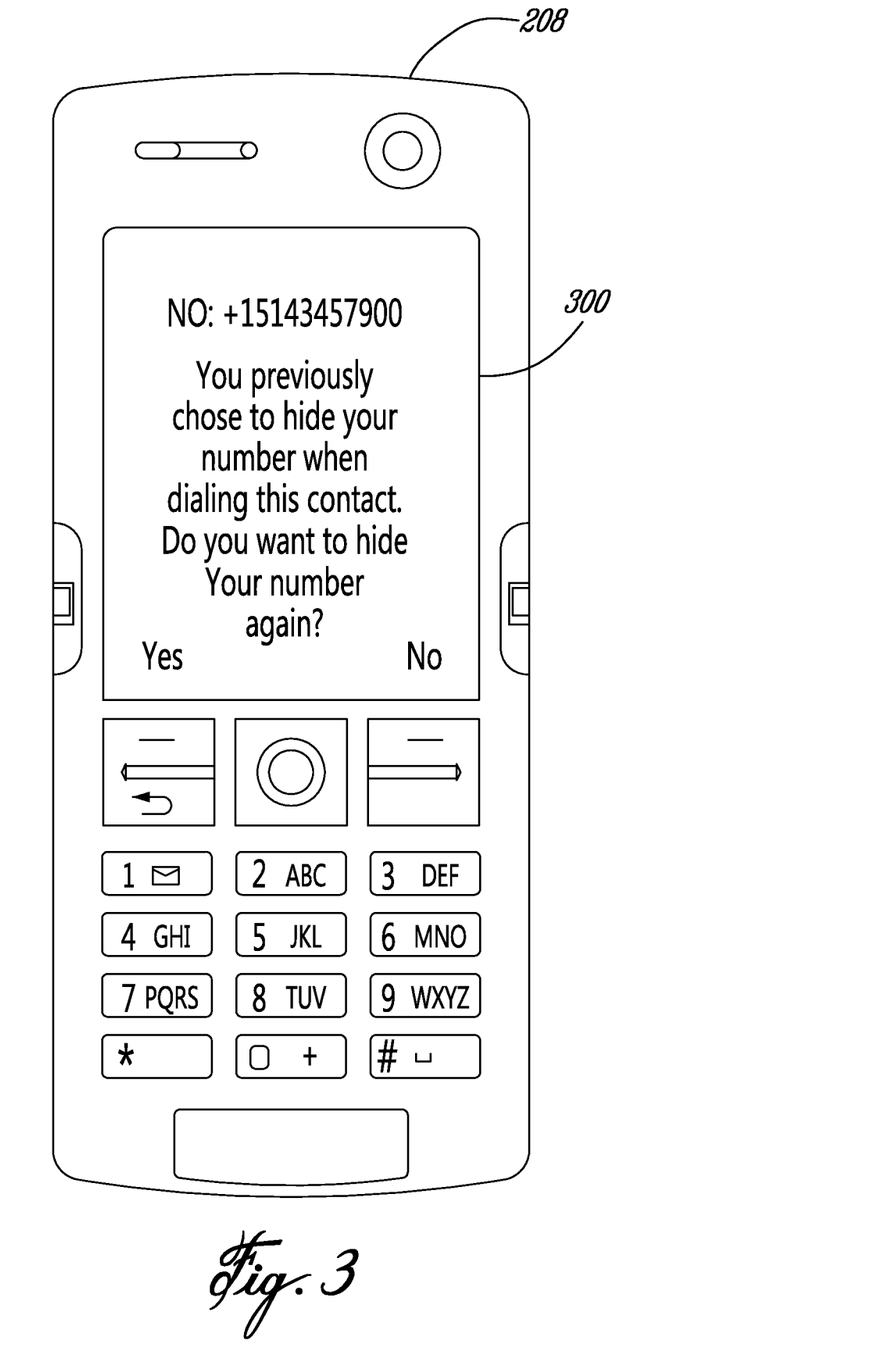
FIG. 3 illustrates a user equipment with a user interface screen associated with an exemplary embodiment.

FIG. 3 depicts a purely illustrative example of a user interface display screen 300 which can be rendered by ACCA 206 on a display mechanism of the UE 208 as she or he finishes dialing a recipient's telephone number. Therein, the active call concierge service according to this exemplary embodiment notifies the user regarding which supplementary service she or he used when dialing the contact number and gives the user the option to select the same service again, prior to UE 208 transmitting the outgoing call request to that called party. Alternatively, or in addition to the display 300 shown in FIG. 3, the user interface of ACCA 206 could display a choice of various supplementary services which could be invoked, e.g., a display screen which listed: 1) Call line identity restriction (CLIR), 2) Connected line presentation (CLOP), 3), etc., along with a request for the user to enter a selection number. Once the user interface of the ACCA 206 receives an input from the user which selects one or more supplementary services to be invoked for the outgoing call, the ACCA 206 automatically appends the corresponding code(s) to the outgoing call request (e.g., using one of the above-described syntaxes) without requiring the user to enter the codes themselves.

Returning to FIG. 2, the outgoing call requests in this example are transported over an air interface from the UE 208 to a GSM network 212. As shown in FIG. 2, exemplary nodes within the GSM network 212 include a mobile switching center (MSC) 250, a home location register (HLR) 252, a media gateway control function (MGCF) 254 and a mobile media gateway (M-MGW) 112, 256. The GSM network 212 forwards the call, and the supplementary service request, to the IMS network 202. An MTAS server 213 which supports supplementary services can, for example, be operating on an IMS core node, e.g., a call service control function (CSCF) node 108, and will be connected to IMS mobility and other IMS core nodes represented by block 214. According to this exemplary embodiment, the MTAS server 213 is connected to, and may be co-located with, the ACCM 200. The MTAS server 213 receives an indication that the caller has invoked a supplemental service and, according to this exemplary embodiment, is programmed with a trigger mechanism which instructs the MTAS 213 to forward supplementary service requests to the ACCM 200 so that the ACCM 200 can track users' behaviors as described above to provide concierge services. Among other things, the forwarded supplementary service request can result in the ACCM 200 verifying whether the caller 208 has access to the concierge service (e.g., whether the caller 208 is a subscriber of the concierge service, if the concierge service is implemented on a subscription basis) and, if so, then the ACCM 200 stores the call attribute(s) and in addition, pushes the call attributes toward the caller's mobile device as described above.

Figure 4:
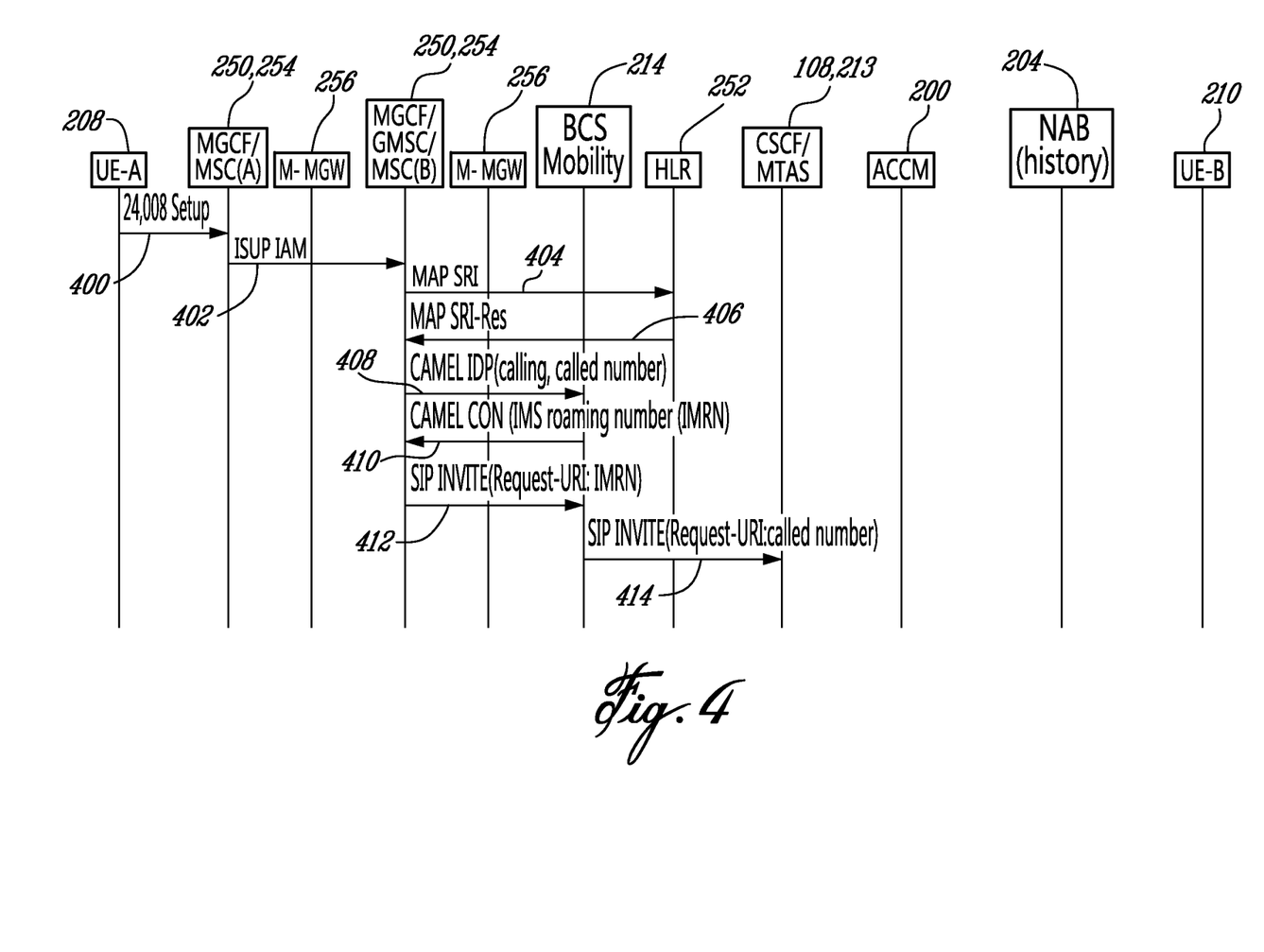
FIG. 4 is a signaling diagram illustrating the provision of concierge services according to an exemplary embodiment.

To aid the reader in better understanding these exemplary embodiments, a signaling flow diagram associated therewith is provided in FIG. 4. This particular signaling diagram depicts the scenario wherein a user A is calling a user B using a supplementary service for the first time, i.e., the concierge service of the network has no record of user A previously invoking a supplementary service when calling user B. Initially, user A dials user B's telephone number (e.g., an E.164 number) into his or her UE 208 and also adds the codes for the supplementary service to hide his or her phone number from the recipient (i.e., OIR as described above) as represented by signal 400. This call setup signal 400 is transmitted over the air interface to the GSM network 212 represented in FIG. 4 by MGCF/MSC(A) 250, 254, i.e., to the originating network. The originating MSC(A) 250 then contacts its counterpart in the recipient's network B via signal 402 to inform the terminating network that a call has been placed to user B associated with that network. The terminating network's MSC(B) 250 signals its corresponding HLR 252 to obtain routing information for user B's UE 210 via signal 404.

Since supplementary service handling has been migrated to an IMS network according to this exemplary embodiment, the terminating network's HLR 252 sends routing information (signal 406) back to the terminating network's MSC(B) 250 which routes the call toward the UE B 210 via the MTAS 213. The MSC(B) 250 will receive the signal 406 from the HLR 252 and trigger a CAMEL IDP signal 408 to the BCS mobility node 214 in the IMS network 202. The BSC mobility node 214 provides the information needed to overlay the circuit-switched call from UE A 208 onto an IMS signal and returns this information to the MSC(B) 250 via signal 410. At this point, the originating GSM network 212 has the information which it needs to generate a SIP INVITE message 412 with an IMS routing number that will direct the call through the IMS network 202. The BCS mobility node 214 receives the SIP invite message 412 and routes it toward the MTAS 213 in the CSCF node 108 as signal 414.

Signal 414 includes an identifier associated with the supplementary service to be invoked, e.g., the OIR service to hide the calling party's mobile number. According to this exemplary embodiment, the MTAS 213 detects this identifier (e.g., an OIR prefix) and informs the ACCM 200 via signal 416. As described above, the ACCM 200 is tasked with tracking the behavior of users to provide concierge services according to these exemplary embodiments. For exemplary embodiments wherein concierge services are provided on a subscription basis, the ACCM 200 may first check to see if the user A associated with UE A 208 has subscribed to concierge services, e.g., by checking a local database. If not, the MTAS 213 can acknowledge the signal from the MTAS 213 and end its processing for this call.

On the other hand, if the calling party is a subscriber, as is the case illustrated in FIG. 4, the ACCM 200 continues on to signal the designated repository (in this example network address book (NAB) 204) with information for storage, e.g., the calling number, the called number and an identifier of the invoked supplementary service via signal 418. The NAB 204 acknowledges receipt of signal 418 to the ACCM 200, which in turn acknowledges signal 416 back to the MTAS 213 via signals 420 and 422, respectively. The ACCM 200 also updates the concierge agent 206 on UE A 208 with this information via signal 424, which the concierge agent 206 can store in memory on the device so that the next time that user A dials user B, UE A 208 can ask whether user A wants to again invoke the OIR supplementary service toward user B, e.g., using the user interface of FIG. 3.

The remainder of the signaling diagram in FIG. 4 relates to the setup of the call after the concierge service has processed the user A's request and captured the data used to perform the concierge service for subsequent calls. The signaling subsequent to signal 424 is thus essentially conventional for completing the call through to user B, will be understood by those skilled in the art and, therefore, is not generally further described herein. Note, however that at signal 426, the GMSC (B) interrogates HLR 252 in the terminating network using a contact prefix of user B and includes a suppress T-CSI parameter in the MAP SRI signal 426. This T-CSI parameter instructs the HLR 252 to suppress T Camel Service for this call, the HLR 252 will return an MSRN to the GMSC(B) and the GMSC(B) will remove the prefix during B-number analysis. Those skilled in the art will appreciate that signal 426 is specific to this particular, purely illustrative embodiment wherein a subscriber uses his or her circuit-switched GSM phone but has an IMS application server provide his supplementary services and that the suppress T-CSI parameter will essentially prevent invoking CAMEL Service Logic for mobile terminating calls in the GMSC(B).

The exemplary embodiments described above relate to methods and systems for providing a concierge service to a user equipment, e.g., associated with invoked supplementary services, which involves the cooperation of several nodes in the system, include the UE 208, the MTAS server 213, an ACCM 200 and a local repository, such as a NAB 204. Such nodes can, at a high level, be architected in a manner represented by communications node 500 shown in FIG. 5. Therein, communications node 500 can contain a processor 502 (or multiple processor cores), memory 504, one or more secondary storage devices 506 and a communications interface 512. In the context of a UE 208, the communications node 500 is capable of running a concierge client application (agent) 206 as an application 510 running on an operating system 508 of the UE 208. Additionally, in the context of a UE 208, the communications interface 512 can include a wireless transceiver for receiving and transmitting signals via an air interface, as well as a display for displaying messages to the user regarding, e.g., whether to invoke previously used supplementary services as described above.

Figure 5:
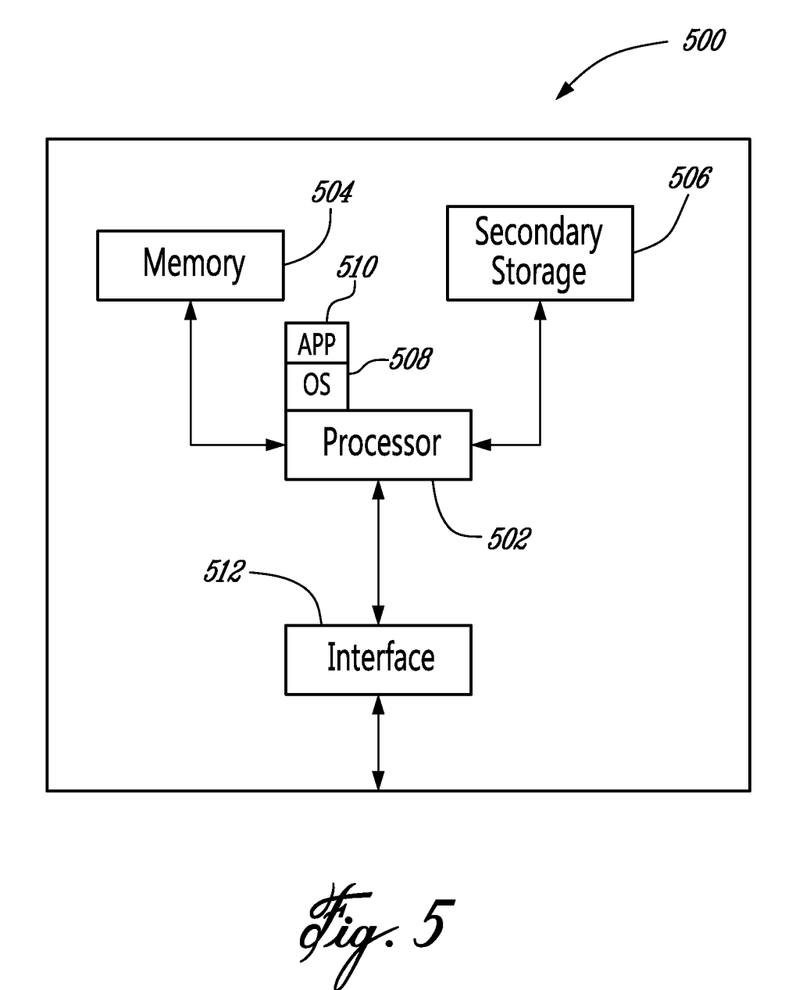
FIG. 5 shows a communication node according to exemplary embodiments.

Alternatively, in the context of an MTAS 213, the processor 502 can run an application 510 which handles supplementary services, including a trigger for contacting an ACCM 200 when an incoming call invokes such services. In the context of an ACCM 200 and local repository, node 500 can represent the node on which a NAB 204 and ACCM 200 are co-located. In such a case memory 504 and/or secondary storage device 506 will contain a database which has been extended to include fields for capturing and logging supplementary service behaviors as shown above, and application 510 will include the ACCM 200.

Figure 6:
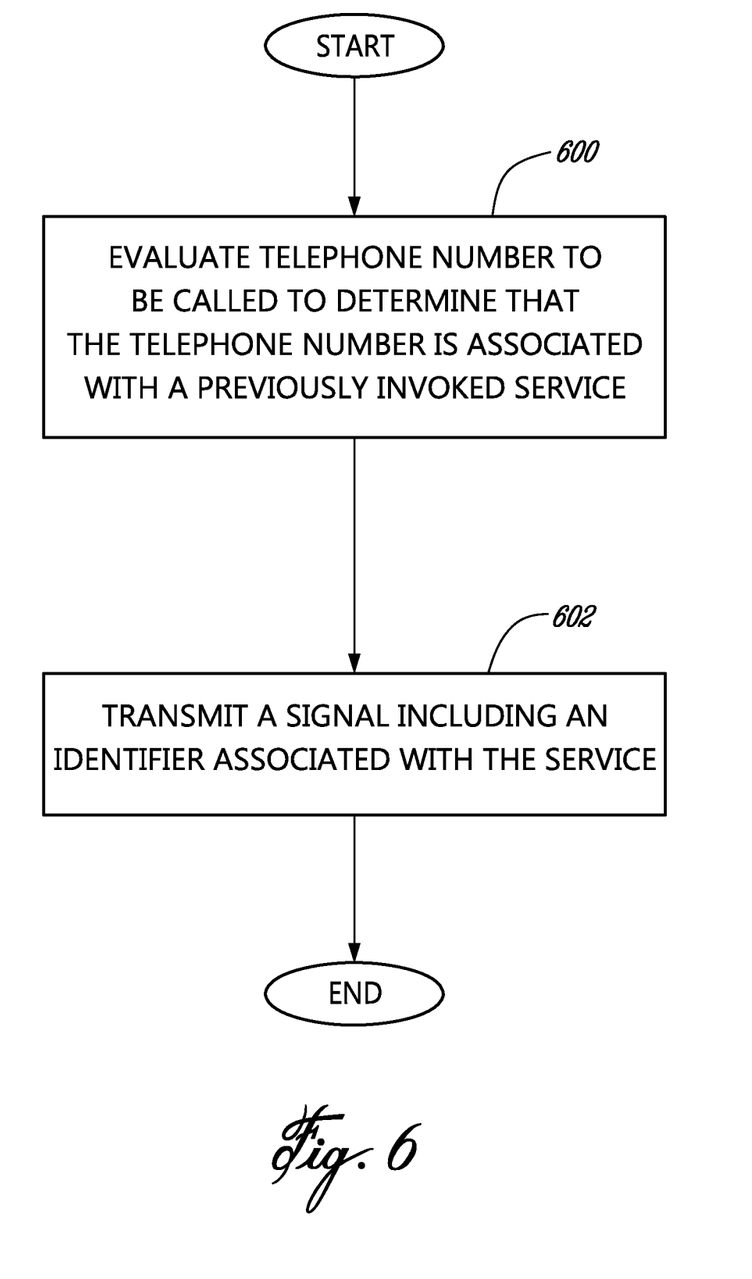
FIG. 6 shows a method flowchart for invoking of a service to be used in a call to be placed by a user equipment according to exemplary embodiments.

Utilizing the above-described exemplary systems according to exemplary embodiments, a method for invoking a service to be used in a call to be placed by a user equipment is shown in the flowchart of FIG. 6. Therein, at step 600, a telephone number to be called is evaluated by the UE to determine whether the telephone number is associated with a previously invoked service. If so, at step 602, a signal including an identifier associated with the service is transmitted. For example, in the case of supplementary services, at least one supplementary service code is automatically appended to a string of characters which includes the telephone number, e.g., to generate the types of character strings described above with respect to supplementary services as the signal. Thus the same supplementary service can be invoked toward the same called party without requiring the user to dial (or even remember) the specific service code associated with that supplementary service.

Figure 7:
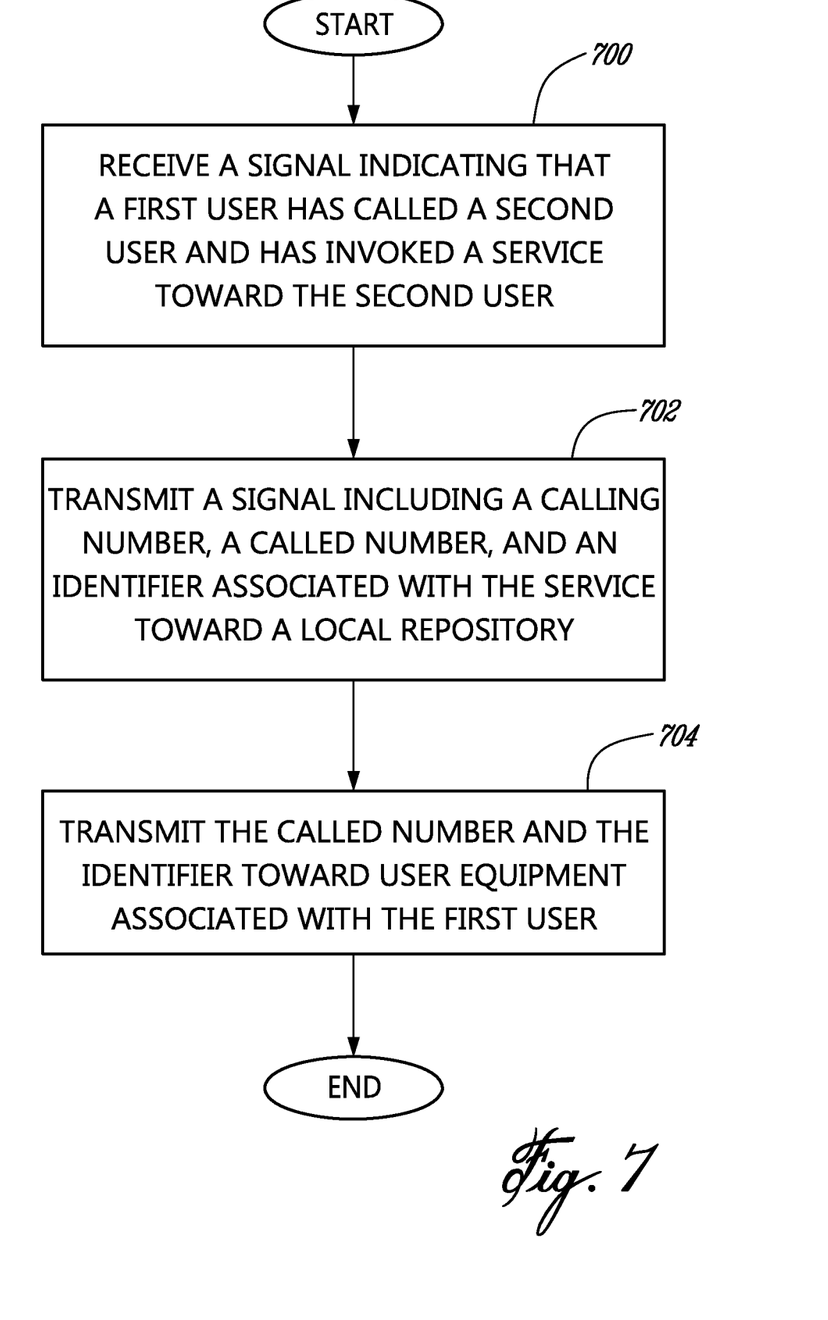
FIG. 7 shows a method flowchart for tracking user behavior and providing a concierge service according to exemplary embodiments.

From the network perspective, a method for tracking user behavior and providing a concierge service can include the steps illustrated in FIG. 7. Therein, at step 700, a signal is received, e.g., by the ACCM 200, indicating that a first user has called a second user and has invoked a service toward the second user. The ACCM 200 transmits a signal including a calling number associated with the first user, a called number associated with the second user and an identifier associated with the service toward a local repository at step 702. The ACCM 200 also transmits a signal including the called number and the identifier associated with the service back toward the user equipment associated with the first user in support of the concierge service, e.g., instructing the UE to add this linked information to its locally stored list which it can use to screen subsequently dialed numbers and provide the aforedescribed concierge service. As described above, the two transmitting steps 702 and 704 can optionally be dependent upon the originating party being determined to be a subscriber of the concierge service.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method comprising:
   determining by a user equipment, based at least in part on a call service provided by a network, that a telephone number to be called by the user equipment is associated with at least one supplementary service previously invoked when the telephone number was previously called, by comparing said telephone number with called numbers stored in said user equipment;
   requesting user input regarding whether to invoke the at least one supplementary service associated with one of said called number which matches said telephone number;
   automatically appending said at least one supplementary service associated with one of said called numbers which matches said telephone number, to a string of characters based on said user input; and
   in response to said determining, transmitting from said user equipment a signal including an identifier associated with the previously invoked supplementary service.

2. The method of claim 1, further comprising:
   automatically appending at least one supplementary service code to the string of characters which includes said telephone number to generate said signal.

3. The method of claim 2, further comprising:
   transmitting said string of characters as part of a call setup signal requesting said at least one supplementary service.

4. The method of claim 1, further comprising:
   receiving, at said user equipment, a signal instructing said user equipment to store a called number and a supplementary service identifier associated with said called number.

5. A user equipment comprising:
   an interface for transmitting and receiving signals; and
   a processor coupled to said interface and to a memory which includes instructions that when executed cause the processor:
   to determine that a telephone number to be called by said user equipment is associated with at least one supplementary service previously invoked when said telephone number was previously called, based at least in part on call service signals over said interface, by comparing said telephone number with called numbers stored in a memory device,
   to request user input regarding whether to invoke said at least one supplementary service associated with one of said called numbers that matches said telephone number,
   to automatically append said at least one supplementary service associated with one of said called numbers that matches said telephone numbers to a string of characters based on said user input, and
   to command said interface to transmit a signal including an identifier associated with said previously invoked supplementary service.

6. The user equipment of claim 5, wherein said processor further automatically appends at least one supplementary service code to the string of characters which includes said telephone number to generate said signal.

7. The user equipment of claim 6, wherein said interface is further configured to transmit said string of characters as part of a call setup signal requesting said at least one supplementary service.

8. The user equipment of claim 5, wherein said interface receives a signal instructing said user equipment to store a called number and a supplementary service identifier associated with said called number in the memory device.

* * * * *